(12) United States Patent
Araújo et al.

(10) Patent No.: US 12,141,371 B2
(45) Date of Patent: *Nov. 12, 2024

(54) COORDINATING ALIGNMENT OF COORDINATE SYSTEMS USED FOR A COMPUTER GENERATED REALITY DEVICE AND A HAPTIC DEVICE

(71) Applicant: Telefonaktiebolaget LM Ericsson (publ), Stockholm (SE)

(72) Inventors: José Araújo, Stockholm (SE); Zeid Al-Husseiny, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/447,376

(22) Filed: Aug. 10, 2023

(65) Prior Publication Data
US 2023/0384872 A1 Nov. 30, 2023

Related U.S. Application Data

(63) Continuation of application No. 17/977,149, filed on Oct. 31, 2022, now Pat. No. 11,868,545, which is a
(Continued)

(51) Int. Cl.
*G06F 3/0346* (2013.01)
*G06F 3/01* (2006.01)
(Continued)

(52) U.S. Cl.
CPC ............ *G06F 3/0346* (2013.01); *G06F 3/012* (2013.01); *G06F 3/014* (2013.01); *G06T 19/006* (2013.01); *G06V 10/76* (2022.01)

(58) Field of Classification Search
CPC .......... G06F 3/011; G06F 3/012; G06F 3/014; G06F 3/016; G06F 3/0346; G06K 9/6214;
(Continued)

(56) References Cited

U.S. PATENT DOCUMENTS 10,943,395 B1 * 3/2021 Green .................. G06F 3/0346
2010/0150404 A1 6/2010 Marks et al.
(Continued)

FOREIGN PATENT DOCUMENTS

EP 2669763 A2 12/2013
JP 2005-147894 A 6/2005
(Continued)

OTHER PUBLICATIONS

International Search Report and Written Opinion of the International Searching Authority mailed dated Oct. 5, 2018 for PCT International Application No. PCT/EP2018/054481, 19 pages.
(Continued)

*Primary Examiner* — Nelson M Rosario
(74) *Attorney, Agent, or Firm* — Sage Patent Group

(57) ABSTRACT

A first electronic device controls a second electronic device to measure a position of the first electronic device. The first electronic device includes a motion sensor, a network interface circuit, a processor, and a memory. The motion sensor senses motion of the first electronic device. The network interface circuit communicates with the second electronic device. The memory stores program code that is executed by the processor to perform operations that include, responsive to determining that the first electronic device has a level of motion that satisfies a defined rule, transmitting a request for the second electronic device to measure a position of the first electronic device. The position of the first electronic device is sensed and then stored in the memory. An acknowledgement is received from the second electronic device indicating that it has stored sensor data that can be used to measure the position of the first electronic device.

11 Claims, 9 Drawing Sheets

Related U.S. Application Data continuation of application No. 16/963,788, filed as application No. PCT/EP2018/054481 on Feb. 23, 2018, now Pat. No. 11,526,216.

(51) Int. Cl.
*G06T 19/00* (2011.01)
*G06V 10/75* (2022.01)

(58) Field of Classification Search
CPC .............. G06T 19/006; G06T 7/73; G06T 2207/30204
See application file for complete search history.

(56) References Cited

U.S. PATENT DOCUMENTS

| | | |
|---|---|---|
| 2013/0023341 A1 | 1/2013 | Yamanouchi |
| 2013/0234925 A1 | 9/2013 | Dearman |
| 2014/0142846 A1 | 5/2014 | Chun et al. |
| 2017/0010663 A1 | 1/2017 | Tanaka et al. |
| 2017/0045736 A1 | 2/2017 | Fu |
| 2017/0220119 A1 | 8/2017 | Potts et al. |
| 2017/0357332 A1 | 12/2017 | Balan et al. |
| 2017/0358139 A1 | 12/2017 | Balan et al. |
| 2018/0217663 A1 | 8/2018 | Chandrasekhar et al. |

FOREIGN PATENT DOCUMENTS

| | | |
|---|---|---|
| JP | 2007-004714 A | 1/2007 |
| JP | 2012-512485 A | 5/2012 |
| JP | 2013-011979 A | 1/2013 |
| JP | 2017-37554 A | 2/2017 |
| WO | 2011/122214 A1 | 10/2011 |

OTHER PUBLICATIONS

Office Action, including English summary, mailed Oct. 1, 2021 for Japanese Patent Application No. 2020-537685, 12 pages.
Office Action mailed May 14, 2024 for Brazilian Patent Application No. 112020017167-0, 4 pages.

* cited by examiner ions of which are hereby incorporated by reference in their entirety.

COORDINATING ALIGNMENT OF COORDINATE SYSTEMS USED FOR A COMPUTER GENERATED REALITY DEVICE AND A HAPTIC DEVICE

CROSS-REFERENCE TO RELATED APPLICATIONS

The present application is a continuation of U.S. patent application Ser. No. 17/977,149 filed on Oct. 31, 2022, which itself is a continuation of U.S. patent application Ser. No. 16/963,788 filed on Jul. 21, 2020, which itself is a 35 U.S.C. § 371 national stage application of PCT International Application No. PCT/EP2018/054481 filed on Feb. 23, 2018, the disclosures of which are hereby incorporated herein by reference in their entirety.

TECHNICAL FIELD

The present disclosure relates the interaction of haptic devices and computer generated reality devices, such as mixed reality devices and virtual reality devices.

BACKGROUND

Haptic devices and Mixed or Virtual Reality (MR or VR) devices will be an increasing part of the future device ecosystem used by society for interpersonal communication, gaming and other applications. Mixed reality computer systems augment what a user sees in the real world with computer generated virtual objects having a pose that makes the virtual objects appear to the user as if they exist in the real world. In contrast, a virtual reality computer system generates entirely virtual world of objects, instead of overlaying the objects on the real world. Both types of systems can enable a user to interact in a seemingly real or physical way using special electronic equipment, such as a head mounted display that displays computer generated objects to a user and a haptic device that tracks movement of the user and which may provide haptic feedback to the user. The term computer generated reality (CGR) is used herein to collectively refer to MR type systems and VR type systems. Accordingly, a CGR system described herein may therefore be a MR system or a VR system unless if defined otherwise in a particular example below.

In a CGR system, a haptic device can provide haptic feedback to a user that enables the user to feel virtual objects while viewing the virtual objects through a display of a CGR device. A challenging problem with CGR systems is how to provide alignment between the coordinate system of the haptic device, such as the workspace of the device, and the coordinate system of the CGR device which can be used to display 3D computer generated objects that are generated based on camera images.

Some known mixed reality systems that integrate haptic devices in a CGR world use an external tracking system. For example, the GO TOUCH VR brand system and the Ultrahaptics brand system use the Leap Motion brand hand tracking device. The HTC Vive brand product tracks its peripheral devices and headset device using an external tracking system, which removes the need for a coordinate system alignment since the same tracking system is employed for tracking all devices. A disadvantage of the HTC Vive is that it must be used within a single room and, therefore, is not mobile beyond those confines.

A need therefore exists for providing a CGR system that provides improved automated alignment of coordinate systems of haptic and CGR devices.

SUMMARY

Some embodiments disclosed herein are directed to a first electronic device that controls a second electronic device to measure a position of the first electronic device. The first electronic device includes a motion sensor, a network interface circuit, a processor, and a memory. The motion sensor is configured to sense motion of the first electronic device. The network interface circuit is configured to communicate with the second electronic device. The processor is connected to the motion sensor and the network interface circuit. The memory stores program code that is executed by the processor to perform operations that include, responding to a determination that the first electronic device has a level of motion as sensed by the motion sensor that satisfies a defined rule, by transmitting a request for the second electronic device to measure a position of the first electronic device. The operations further include sensing and storing a position of the first electronic device in the memory, and receiving an acknowledgement from the second electronic device indicating that it has stored sensor data that can be used to measure the position of the first electronic device.

In some further embodiments, the first electronic device includes a haptic device that is configured to perform at least one of measuring movement of the haptic device by a user and providing haptic feedback to a user. The request is transmitted to the second electronic device that includes a CGR device which is configured to display graphics as an overlay on real world objects. A measurement of the position of the haptic device is received from the CGR device. A transformation matrix is then determined for transforming a pose referenced in a first coordinate system to a pose referenced in a second coordinate system based on the position of the haptic device retrieved from the memory and based on the measurement of the position of the haptic device received from the CGR device. One of the first and second coordinate systems is used to reference a pose of one of the haptic and CGR devices and the other one of the first and second coordinate systems is used to reference a pose of the other one of the haptic and CGR devices.

A potential advantage of these operations is that the transformation matrix between the coordinate systems can be generated with an operational accuracy that can be more consistently repeated relative to prior art approaches. The second electronic device measures a position of the first electronic device when the first electronic device is determined to have a level of motion that satisfies a defined rule, such as when the first electronic device is stationary. Accordingly, the first and second electronic devices are more likely to measure the same position of the first electronic device, which increases accuracy of the resulting transformation matrix between the respective coordinate systems. The defined rule may also be satisfied when the first electronic device has a constant velocity, since the difference between the positions measured by the first and second electronic devices can be mathematically compensated for using the known constant velocity of the first electronic device, which again results in increased accuracy of the resulting transformation matrix.

Some other related embodiments are directed to a second electronic device for measuring a position of a first electronic device relative to the second electronic device. The second electronic device includes a sensor, a network interface circuit, a processor, and a memory. The sensor is configured to output sensor data that can indicate a position of the first electronic device. The network interface circuit is configured to communicate with the first electronic device. The processor is connected to the sensor and the network interface circuit. The memory stores program code that is executed by the processor to perform operations that include receiving a request to send a measurement by the second electronic device of a position of the first electronic device. The operations further include, responsive to the request, initiating operations for generating a measurement of the position of the first electronic device, and storing in the memory sensor data output by the sensor that can indicate the position of the first electronic device. An acknowledgement is transmitted which indicates that the sensor data has been stored. A measurement of the position of the first electronic device is generated based on the sensor data stored in the memory, and is transmitted from the second electronic device.

In some further embodiments, the operations further include determining whether an abort message has been received that indicates that a level of motion of the first electronic device, which is sensed during a time interval between when the request was received and when the acknowledgement was transmitted by the second electronic device, has ceased to satisfy the defined rule. The operation for transmitting the measurement of the position of the first electronic device is performed responsive to the determination being that no abort message has been received.

Some other related embodiments are directed to a server that includes a network interface circuit, a processor, and a memory. The network interface circuit is configured to communicate with a first electronic device and a second electronic device. The processor is connected to the network interface circuit. The memory stores program code that is executed by the processor to perform operations that include receiving, from the first electronic device, a measurement by the first electronic device of the position of the first electronic device. The operations further include receiving from a second electronic device a measurement by the second electronic device of a position of the first electronic device, and generating a transformation matrix for transforming a pose referenced in a first coordinate system to a pose referenced in a second coordinate system responsive to the position of the first electronic device received from the first electronic device and the position received from the second electronic device. One of the first and second coordinate systems is used to reference a pose of one of the first and second electronic devices and the other one of the first and second coordinate systems is used to reference a pose of the other one of the first and second electronic devices.

Some related embodiments are directed to a method by a first electronic device for controlling a second electronic device to measure a position of the first electronic device. The method includes responding to a determination that the first electronic device has a level of motion that satisfies a defined rule, by transmitting a request for the second electronic device to measure a position of the first electronic device, and sensing and storing the position of the first electronic device in a memory. An acknowledgement is received from the second electronic device indicating that it has stored sensor data that can be used to measure the position of the first electronic device.

Some other related embodiments are directed to a method by a second electronic device for measuring a position of a first electronic device relative to the second electronic device. The method includes receiving a request to send a measurement by the second electronic device of a position of the first electronic device. Responsive to the request, the method initiates operations for generating a measurement of the position of the first electronic device, and storing in a memory the sensor data output by a sensor that can indicate the position of the first electronic device. An acknowledgement is transmitted that indicates the sensor data has been stored. A measurement of the position of the first electronic device is generated based on the sensor data stored in the memory. The measurement of the position of the first electronic device is transmitted from the second electronic device.

Some other related embodiments are directed to a method by a server. The method includes receiving, from the first electronic device, a measurement by the first electronic device of the position of the first electronic device. A measurement by a second electronic device of the position of the first electronic device is received from the second electronic device. A transformation matrix for transforming a pose referenced in a first coordinate system to a pose referenced in a second coordinate system is generated responsive to the position of the first electronic device received from the first electronic device and the position received from the second electronic device. One of the first and second coordinate systems is used to reference a pose of one of the first and second electronic devices and the other one of the first and second coordinate systems is used to reference a pose of the other one of the first and second electronic devices.

Other electronic devices, servers, and corresponding methods according to embodiments will be or become apparent to one with skill in the art upon review of the following drawings and detailed description. It is intended that all such additional electronic devices, servers, and corresponding methods be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
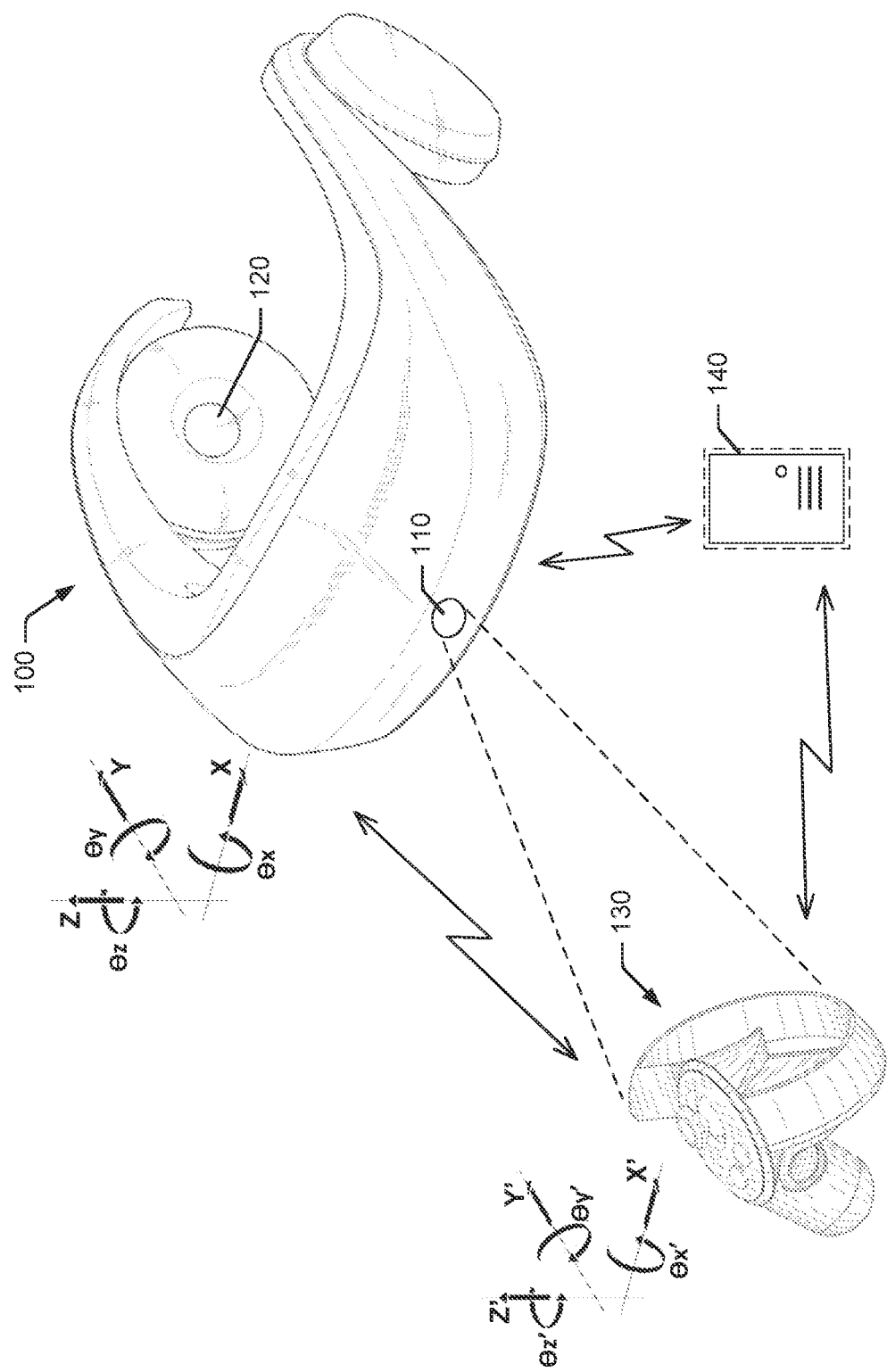
FIG. 1 illustrates a CGR system that includes a haptic device and a CGR device which operate in accordance with some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Coordinate systems of haptic and CGR devices can be aligned through use of transformation matrices, which enable transformation of the location and/or rotational angles (e.g., location and rotation of a 6 degree of freedom (DOF) coordinate system) of an object or device referenced in one ordinate system to another coordinate system. A transformation matrix may be generated using a sensor of a CGR device, such as a front facing camera of a MR device, to detect the position (location) of the haptic device in the coordinate system of the MR device, and the onboard sensors of the haptic device which are used to track its motion (e.g., based on the Geomagic Touch or GO TOUCH VR devices) and detect its position in the coordinate system of the haptic device. Based on the position of the haptic device in the haptic device coordinate system and the position of the haptic device in the CGR device coordinate system a transformation matrix can be generated which relates the two coordinate systems. Accuracy of the transformation matrix may be increased by taking several position measurements by the sensor in the haptic device and/or several position measurements by the sensor in the CGR device. A transformation matrix that better approximates the relation between the two coordinate systems is computed, using e.g. least squares or other regression methods.

As used herein, the term "pose" refers to the position and/or the rotational angle of a device relative to a defined coordinate system. A pose may therefore be defined based on only the multidimensional position of the device, the multidimensional rotational angles of the device, or a combination thereof. The term "position or pose" refers to position, rotational angle, or combination thereof.

As explained above, aligning the coordinate systems of two electronic devices, such as a haptic device and a CGR device, can be challenging. The challenge increases when the two devices are not synchronized in their sensor measurements, such as when the haptic device measure its position at 1 kHz (e.g. as done by Geomagic Touch) and when the CGR device takes images at 60 Hz (e.g., as done by Microsoft Hololens). For example, the Hololens device can take between 10 ms to 50 ms to process the image it takes of a haptic device to measure the position of the haptic device, depending on the other tasks running in the Hololens device. In order to accurately calculate transformations between the coordinate systems, a system should ensure that the timing of the measurements from both devices which are used to compute the transformation are the same, i.e. the position pairs correspond to measurements taken at the same time, or be aware of the time offset between the measurement timings.

One approach to ensuring near-simultaneous sensing of the devices' positions is to configure the CGR system to operationally synchronize the sensing operations by the devices and calculate a measurement latency at the Hololens and then find the position measurement from the haptic device that corresponds to the same time as the position measurement captured by the Hololens. This synchronized sensing approach requiring a complex synchronization operation and algorithm, is prone to synchronization errors (e.g., drift in the synchronization clocks of the devices), is subject to the deleterious effects on synchronization accuracy due to latency variability in the communication network between the devices, and requires frequent message passing between the devices related to maintaining and measuring synchronization.

Embodiments of the present disclosure are directed to providing improved alignment of coordinate systems between two electronic devices, such as a haptic device and a MR device or other CGR device. The haptic device can sense its position in its own coordinate system, and the CGR device is able to sense the position of the haptic device in the CGR device's coordinate system which may be the same as that used for a camera of the CGR device.

Some embodiments of the present disclosure can perform alignment of coordinate systems of two devices using a reduced complexity operational algorithm and reducing the need for communications between the devices. In some embodiments, a haptic device uses its relatively fast position measurement to identify when the haptic device is static, i.e. the speed of the device is below a noise level threshold, and responsive thereto sends a request to the CGR device to sense the position of the haptic device (in the CGR device coordinate system) and the haptic device itself also captures its own position (in the haptic device coordinate system). Since the haptic device is static, the position sensed by both the CGR device and haptic device is the same and, thereby, eliminates the need for the alignment operations to use any timing information of when each device completed its respective position sensing. Several sensed measurements of different static positions can be taken at each device, and used to compute the transformation between the two coordinate systems to improve alignment of the coordinate systems. As will be explained in further detail below, the haptic device can also trigger sensing of its position by itself and sensing of its position by the CGR device although the haptic device is moving, such as when haptic device determines that it has a substantially constant velocity (i.e., when it's translational and/or rotational velocity does not change more than a defined threshold amount during a time interval).

Although various embodiments are disclosed herein in the context of MR devices and other CGR devices used in combination with haptic devices, these embodiments are not limited thereto. Embodiments of the present disclosure can operate to provide alignment of coordinate systems used as references for any two types of electronic devices such as between any display device (e.g. MR device, VR device, smartphone screen) which is configured to sense the position of another device that is configured to sense its own position (e.g. a haptic device or a gaming object that may move by user, such as a game controller or a gaming sword, gun steering wheel, etc.).

FIG. 1 illustrates a CGR system that includes a haptic device 130 and a CGR device 100 which operate in accordance with some embodiments of the present disclosure.

Referring to FIG. 1, the example CGR device 100 can be a MR device having a forward-facing camera 110 which is configured to optically sense the position of the haptic device 130. The CGR device 100 can be configured to display graphical objects as an overlay on real-world objects that are viewable through the camera 110 and/or that are viewable through a see-through display (e.g., Google Glass). Graphical objects may be generated by the MR device and/or by the server 140. The CGR device 100 may include one or more speakers 120.

The haptic device 130 includes onboard sensors that sense the present position of the haptic device 130. The haptic device 130 may include a haptic feedback generation device 750 (FIG. 7) that is configured to provide haptic feedback to a user, such as force feedback and/or vibration feedback. The onboard sensors may include a motion sensor 740 (FIG. 7), rotational and/or translational position encoders, an Infrared (IR) positioning system, and/or other sensor configured to sense the present position or pose of the haptic device 130. The haptic device 130 may include components of Geomagic Touch product. In one embodiment, the position or pose is measured at 1 kHz using encoders in the motors of the haptic device 130. The haptic device 130 and the CGR device 100 include network interface circuits, which may be configured to communicate through wired and/or wireless communication links directly with each other and/or via a server 140 or another device (e.g., a network router or relay).

The CGR device 100 may sense its present position or pose using the camera 110 and/or using a motion sensor, such as an Inertial Measurement Unit, configured to sense the present position or pose of the haptic device 130. The CGR device 100 can alternatively sense the present position or pose of the haptic device 130 using the camera 110, spaced apart RF transmitters and receivers (e.g., Ultra-Wide Band or Wi-Fi radios) configured to perform triangulation of RF signals transmitted to and/or received from the haptic device 130, and/or using another sensor configured to sense the present position or pose of the haptic device 130. The CGR device 100 may include components of the Microsoft Hololens product, such as its camera and communication circuitry.

In the description of example embodiments below, the position of the haptic device 130 in homogeneous coordinates is referred to as P, where $P=[p\ 1]^T$ ($[\ldots]^T$ represents the transpose of a matrix $[\ldots]$). The term p is a vector and $p=[X,Y,Z]$ denotes the three-dimensional (3D) position of the haptic device 130 in cartesian coordinates. Additionally, the term S(P) is defined as a set of all recorded haptic device 130 positions in the coordinate system of the haptic device 130. The position of the haptic device 130 relative to a coordinate system of the CGR device 100 is referred to as $P^{CGR}$, in homogenous coordinates, where $P^{CGR}=[p^{CGR}\ 1]^T$ and $p^{CGR}=[X^{CGR},Y^{CGR},Z^{CGR}]$ is in cartesian coordinates. The set of positions of the CGR device 100 is $S^{CGR}(P^{CGR})$. The set of each pair of haptic device positions sensed by both the haptic device 130 and the CGR device 100 are stored in a set $Q(P,P^{CGR})$.

Furthermore, the term $V_P$ refers to the translational velocity and the term $V_{alpha}$ refers to the rotational velocity. The term $\hat{V}(t)$ refers to an estimate of the velocity V, t seconds in the future, which may be estimated based on the analysis of the motion acceleration and/or previous motion patterns which have been performed by the user.

The term epsilon refers to a constant value that may be defined by the user and/or by an executable application.

In the example of FIG. 1, the haptic device 130 is configured to sense its pose in a first 6 DOF coordinate system, illustrated as translational directions X', Y', Z' and rotational directions $\Theta x'$, $\Theta y'$, $\Theta z'$, which can correspond to roll, pitch, and yaw. Similarly, the CGR device 100 is configured to sense the position of the haptic device 130 in a second 6 DOF coordinate system, illustrated as translational directions X, Y, Z and rotational directions $\Theta x$, $\Theta y$, $\Theta z$, which can correspond to roll, pitch, and yaw. Although, embodiments may be used with any multi-dimensional coordinate system.

In accordance with various embodiments herein, the haptic device 130, the CGR device 100, and/or the server 140 is configured to generate a transformation matrix for transforming a pose (e.g., position, rotational angle, and/or a combination thereof) referenced in one of the first and second coordinate systems to the other one of the first and second coordinate systems, and may furthermore generate another transformation matrix for transforming a pose in the other direction from the other one of the first and second coordinate systems to the one of the first and second coordinate systems. The haptic device 130 may generate the transformation matrix and communicate it to the CGR device 100, so that the CGR device 100 can adjust the pose of objects it displays on a display device 850 (FIG. 8) for a user.

For example, a virtual object can have haptic properties which are defined in the first coordinate system referenced by the haptic device 130. The CGR device 100 may receive metadata about the virtual object, such as from the haptic device 130 itself and/or the server 140, where the metadata may include the shape, color shading, and pose of the virtual object relative to the first coordinate system. The haptic device 130 can transmit the transformation matrix to the CGR device 100 to cause the CGR device 100 to transform the metadata (e.g., pose) of the virtual object from the first coordinate system of the haptic device 130 to the second coordinate system of the CGR device 100. The CGR device 100 can then display the virtual object using the transformed metadata on a display device for viewing by a user. These operations enable the virtual object to be more accurately illustrated and have its haptic properties operationally tracked relative to real objects, such as to the user's fingers, hand, arm or other physical object.

The haptic properties of the virtual object may cause the CGR device 100 to control the haptic device 130 to provide haptic feedback to a user when haptic properties are satisfied, such as when a user's finger is determined to have positionally touched a surface of the virtual object. Alternatively or additionally, the haptic properties of the virtual object may cause the CGR device 100 to move and/or rotate the displayed virtual object or otherwise change its displayed appearance responsive to determining that the haptic properties are satisfied, such as when user's finger is determined to have positionally touched the surface of the virtual object.

Conversely, a new virtual object that is created in a second coordinate system of the CGR device 100 can have its metadata sent to the haptic device 130 to, for example, control feedback provided by the haptic device 130 to a user and/or to control position determination of the haptic device 130 relative to the new virtual object. The haptic device 130 uses the metadata to compute a transformation matrix that is used to transform the pose of the virtual object from the second coordinate system of the CGR device 100 to the first coordinate system of the haptic device 130.

Figure 2:
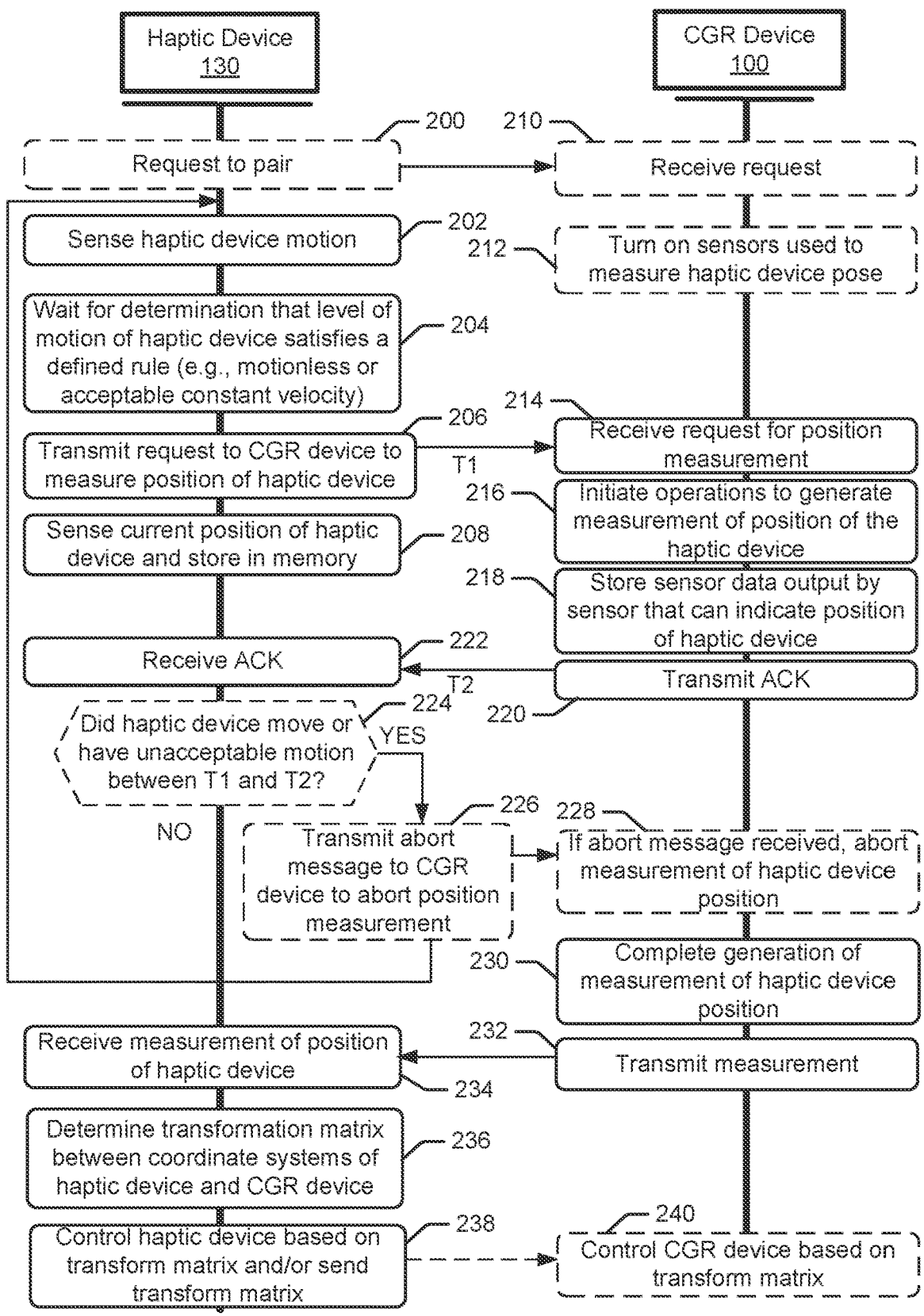
FIG. 2 illustrate a data flow diagram and flowchart of operations by a haptic device and a CGR device which operate in accordance with some embodiments of the present disclosure.
Figure 7:
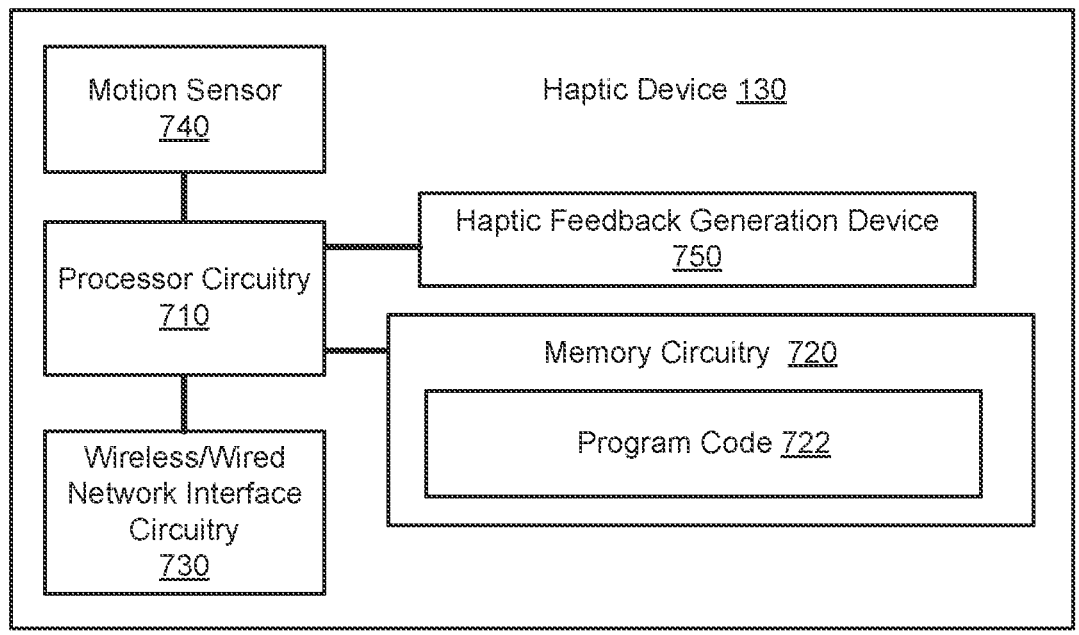
FIG. 7 is a block diagram of haptic device components that are configured in accordance with some other embodiments of the present disclosure.
Figure 8:
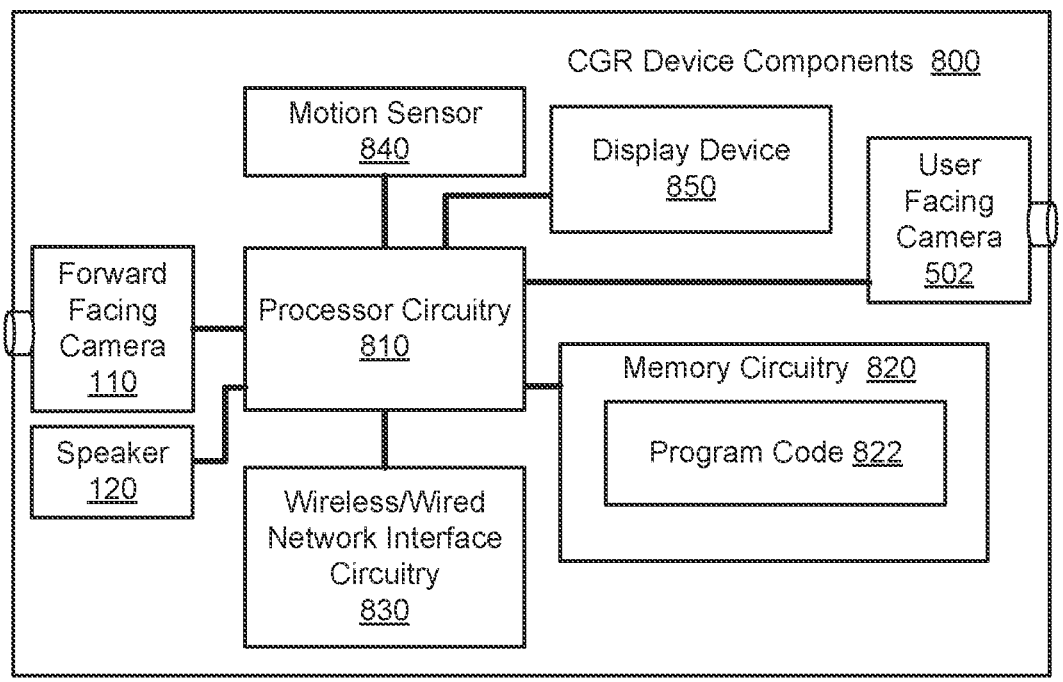
FIG. 8 is a block diagram of CGR device components that are configured in accordance with some other embodiments of the present disclosure.

FIG. 2 illustrate a data flow diagram and flowchart of further example operations that can be performed by a haptic device 130 and a CGR device 100 which operate in accordance with some embodiments of the present disclosure. FIG. 7 is a block diagram of haptic device components that are configured in accordance with some other embodiments of the present disclosure, and FIG. 8 is a block diagram of CGR device components that may be used in the CGR device 100 and/or CGR device 500 described above in accordance with some other embodiments of the present disclosure.

Referring to FIG. 2 with further reference to FIGS. 7 and 8, which will be described in further detail below, the haptic device 130 controls the CGR device 100 to measure a position of the haptic device 130. The haptic device 130 of FIG. 2 is configured to determine a transformation matrix between the first and second coordinate systems of FIG. 1.

The haptic device includes a motion sensor 740, network interface 730, processor 710, and a memory 720. The motion sensor 740 is configured to sense motion of the haptic device 130. The network interface circuit 730 is configured to communicate with the CGR device 100, such as through direct wireless and/or wired communications, and/or with the server 140. The processor 710 is connected to the motion sensor 740 and the network interface circuit 730. The memory 720 stores program code that is executed by the processor 710 to perform operations that are explained below with regard to FIG. 2.

The CGR device 100 measures a position of a haptic device 130 relative to the CGR device 100, includes a sensor 110, a network interface circuit 830, processor 810, and a memory 820. The sensor 110 is configured to output sensor data that can indicate a position of the haptic device 130. The network interface circuit 830 is configured to communicate with the haptic device 130. The processor 810 is connected to the sensor 110 and the network interface circuit 830. The memory 820 stores program code is executed by the processor 810 to perform operations that are also explained below with regard to FIG. 2.

The haptic device may communicate 200 a request to pair to the CGR device 100, which can responsively receive 210 the request. Operation 200 may be initiated by the user by pressing a button or by start-up of an application executed by the haptic device 130. Operation 200 may additionally or alternatively be triggered when coordinate system alignment or updated alignment is determined to be needed, such as when triggered by a user and/or triggered automatically by the CGR device 100 as will be described below with regard to FIG. 6. The CGR device 100 may use an eye facing camera to capture corneal images from the user which it analyzes to determine when there is excessive misalignment between graphics for virtual computer-generated object displayed on a display device 850 of the CGR device 100 and a real world object viewed by the user. The CGR device 100 can then trigger updating of the transformation matrix when there is excessive misalignment.

As will be explained in further detail below with regard to FIG. 6, the corneal image can be analyzed to identify occurrence of excessive misalignment between the first and second coordinate systems, such as when a virtual object that should be aligned with a specific real object has excessive misalignment therebetween.

The sensor, e.g. the front facing camera 110, may be turned off when not used to conserve power. The CGR device 100 may respond to the request by turning-on 212 the sensor that it will use to measure the position of the haptic device 130. The haptic device 130 operates the motion sensor 740 to sense 202 its motion. Responsive to determining 204 that the haptic device 130 has a level of motion as sensed by the motion sensor 740 that satisfies a defined rule, the haptic device 130 transmits 206 a request for the CGR device 100 to measure a position of the haptic device 130.

The haptic device 130 may determine that it's level of motion satisfies the defined rule when, for example, one or more the following conditions exist:

$$V_P <= \text{epsilon} \quad \text{a)}$$

$$\ddot{V}(t) <= \text{epsilon} \quad \text{b)}$$

In one embodiment, the epsilon value is about 0 or another defined threshold value. An epsilon value of 0 can be hard to observe since the haptic device 130 may experience very small motions and/or the output of the motion sensor 740 may be affected by noise and/or drift. Accordingly, the value of epsilon can be chosen based on a desired level of accuracy for the resulting transformation matrix used for coordinate system alignment. The haptic device position P is then stored in S and Q. The defined rule may further include determining whether the current measured position P is already in a set of recorded positions S and/or whether the current measured position has expired because of an elapsed threshold time since its determination.

Condition (b) above may be more generally advantageous since one can perform a request for a measurement in the future which reduces the latency to receive a position measurement from the CGR device 100. A request for a measurement from the haptic device 130 to the CGR device 100 and in operation for capturing an image incurs a non-zero latency. The latency may be enough for a movement of the haptic device 130 to occur. However, using a predictive request enables computational compensation for such latency and more consistent alignment of the coordinate systems despite motion of the haptic device 130.

It is positional measurement of the haptic device 130 by the CGR device 100 may be improved by limiting the measurement to occurring when haptic device 130 has a rotational speed that is below a defined threshold.

In an additional embodiment, the user may be requested, e.g., via the display of the CGR device 100, to stop moving the haptic device 130 when it is recognized that a position measurement is required. Similarly, the user may be requested to move the haptic device 130 into a position or to a pair of different positions, which is not yet part of the set S and Q, respectively. Such guidance may be provided to the user via haptic feedback provided through the haptic device 130, by audio feedback via the speaker 120 of the CGR device 100, and/or by information displayed on the display device 850 of the CGR device 100.

With further reference to FIG. 2, when the defined rule is satisfied the haptic device 130 senses and stores 208 the position of the haptic device 130 in the memory 720. The CGR device 100 receives 214 the request, and responsively initiate 216 operations for generating a measurement of the position of the haptic device 130. The CGR device 100 stores 218 in the memory 820 sensor data that is output by the sensor, e.g., digital picture from the camera 110, that can indicate the position of the haptic device 130. The CGR device 100 then transmits 220 an acknowledgement indicating that the sensor data has been stored.

The haptic device 130 receives 222 the acknowledgement from the CGR device 100 indicating that it has stored the sensor data that can be used to measure the position of the haptic device 130. The haptic device 130 may determine 224 whether an abort condition has occurred in which a level of motion of the haptic device 130, which is sensed during a time interval between when the request was transmitted 206 to the CGR device 100 and when the acknowledgement was received 222 from the CGR device 100, has ceased to satisfy the defined rule. Responsive to the abort condition occurring, the haptic device 130 transmits 226 an abort message to the CGR device 100 to abort operations for measuring the position of the haptic device 130.

In one illustrative embodiment, when the haptic device 130 has not moved or otherwise has motion that satisfies the defined rule, further operations are performed to determine a transformation matrix between the first and second coordinate systems. In contrast, when the haptic device 130 is determined to have moved or to otherwise have had motion that did not satisfy a defined rule, a message is transmitted to the CGR device 100 to cancel its current measurement of the position of the haptic device 130.

Let T1 be the time at which the request for a measurement was transmitted 206 to the CGR device 100 and let T2 be the time at which the ACK was received 222, when the haptic device 130 is determined to have had motion that violated the defined rule during the time interval between T1 and T2, a message is transmitted 226 to the CGR device 100 to abort the measurement since the stored sensor data indication of the haptic device's position is no longer valid. In contrast, when the haptic device 130 is determined to not have had motion that violated the defined role during the time interval between T1 and T2, the haptic device 130 proceeds with operations to determine the transformation matrix.

The time T2-T1 may be based on or equal to Delta_N*2+ Delta_C, where Delta_N is the network latency, and Delta_C is the time between when the request is transmitted 206 for a new image and when the image is acquired and stored in memory of the CGR device 100 for subsequent processing to determine the position of the haptic device 130. The Delta_C may be defined based on the camera frame rate (e.g. 60 Hz), and the network latency may be about 1 ms to about 5 ms depending on the network communication protocol and pathway used for communications whether communications are delayed due to sharing of communication resources with other devices and/or other applications on the same devices. Hence T2-T1 may be about 20 ms, which is then the acceptable duration for which the haptic device should not move or should not otherwise have motion that exceeds the defined rule.

For the case where a server 140 is used to collect the measured position from both the haptic device 130 in the CGR device 100 and to perform operations to determine the transformation matrix used for coordinate system alignment transformations, if a message from the haptic device 130 is received with information that the haptic device 130 has moved, Delta_B seconds after receiving the ACK from the CGR device 100, where Delta_B is higher than the maximum admissible Delta_N, then the server 140 transmits a message to the CGR device 100 to abort its collecting the measured positions and performing operations to determine the transformation matrix.

With further reference to FIG. 2, the CGR device 100 determines 228 whether an abort message has been received that indicates that a level of motion of the haptic device 130, which is sensed during a time interval between when the request was received 214 and when the acknowledgement was transmitted 220, has ceased to satisfy the defined rule. Responsive to no abort message having been received, the CGR device 100 completes generation 230 of a measurement of the position of the haptic device 130 based on the sensor data stored in the memory, and transmits 232 the measurement of the position of the haptic device 130. Accordingly, transmission of the measurement of the position of the haptic device 130 is performed responsive to the determination 228 being that no abort message has been received.

In one embodiment, the CGR device 100 uses a position estimation algorithm, such as a vision-based position identification operation the processes a digital photo of the haptic device 130 by the camera 110 stored 218 in the memory, to estimate the position of the haptic device 130 in the second coordinate system of the CGR device 100. The acknowledgement (ACK), which indicates that the digital photo has been captured, is sent 220 to the haptic device 130. The position estimation algorithm continues to be performed to estimate the position of the haptic device 130 using the stored digital photo, although the acknowledgment message is transmitted 220 as soon as it is determined that the digital photo is stored in memory.

The vision-based position estimation algorithm may determine the position based on identifying one or more markers connected to or visible on the haptic device 130, a portion of the housing of the haptic device 130, and/or another visually identifiable feature of the haptic device 130. The algorithm may be based on an algorithm used by the Hololens product, which uses the HololensARToolKit that takes between 20 and 50 ms from capturing an digital picture to outputting the position estimate of a marker attached to the haptic device 130. The vision-based position estimation algorithms may alternatively or additionally be based on one or more algorithms provided through the Open Source Computer Vision Library (OpenCV).

In some other embodiments, the position of the haptic device is estimated using spaced apart RF transmitters and receivers (e.g., Ultra-Wide Band or Wi-Fi radios) configured to perform triangulation of RF signals transmitted to and/or received from the haptic device 130.

The haptic device 130 receives 234 the measurement of the position of the haptic device 130 which is referenced in the second coordinate system $P^{AR}$ of the CGR device 100. The measured haptic device position in the second coordinate system $P^{CGR}$ can be stored in $S^{CGR}$ and Q.

The haptic device 130 responsively determines 236 a transformation matrix for transforming a pose (i.e., position, rotational angle, and/or combination thereof) referenced in one of the first and second coordinate systems to a pose that is referenced in the other one of the first and second coordinate systems, based on the position of the haptic device 130 retrieved from the memory of haptic device 130 and based on the position of the haptic device 130 received from the CGR device 100.

In one embodiment, when the number of the linearly independent position vectors in set Q is larger than N, i.e. rank(Q)>=N, the calculation of the transformation matrix between the first coordinate system of the haptic device 130 and the second coordinate system of the CGR device 100 can be performed. For the calculation of the transformation matrix to be performed for both position and orientation, the number of linearly independent vectors in the set Q is larger than N>=12 (which is the minimum number of parameters to be identified in the transformation matrix). The calculation of the transformation matrix may be performed via least-squares operations where the operations find the transform T, which relates the two coordinate systems as $P^{CGR}=T*P$, where $$P^{CGR} = [p^{CGR}1]^T,$$

$$P = [p\ 1]^T,$$

$$\text{and } T = \begin{bmatrix} R & t \\ [0, 0, 0] & 1 \end{bmatrix},$$

$$\text{where } R = \begin{bmatrix} r11 & \cdots & r13 \\ \vdots & \ddots & \vdots \\ r31 & \cdots & r33 \end{bmatrix}$$

with $r_{ii} \in \mathbb{R}$, and $t=[t_1, t_2, t_3]^T$ with $t_i \in \mathbb{R}$. Let $M=[P(1)^T; P(2)^T; \ldots; P(n)^T]$ and $M^{CGR}=[P^{CGR}(1)^T; P^{CGR}(2)^T; \ldots; P^{CGR}(n)^T]$ be a column matrix composed the pose measurements P and P' for all measurements i in the set Q, respectively. The transform T is obtained as the transform which minimizes $\|M*T^T - M^{CGR}\|$. Other methods such as Direct Linear Transformation (DLT) may also be used to compute the transformation matrix.

The transformation matrix may be used 238 to control the haptic device 130 and/or can be sent to the CGR device 100 and/or to the server 140. For example, the transformation matrix may be used to transform a pose of the haptic device 130 from one of the first and second coordinate systems to the other one of the first and second coordinate systems, to generate a transformed pose. Generation of haptic feedback by the haptic device 130 may be controlled based on the transformed pose. Alternatively or additionally, the CGR device 100 may be controlled 240 based on the transformation matrix, such as by displaying on a display device a graphical object with a pose that is determined based on the transformation matrix.

In some embodiments, the operations for determining 204 that the level of motion sensed by the motion sensor 740 satisfies the defined rule, such as when the haptic device 130 remains stationary during a time interval between when the request was transmitted 206 (time T1) to the CGR device 100 and when the acknowledgement was received 222 (time T2) from the CGR device 100.

In contrast, in some other embodiments, the defined rule is satisfied when the haptic device 130 remains stationary or has a velocity that does not change more than a defined threshold amount during the time interval between T1 and T2. The operation for estimating an updated position of the haptic device 130 is then performed based on an amount that the position of the haptic device 130 retrieved from the memory 720 is determined to have changed due to the velocity of the haptic device 130 over at least a portion of the time interval between T1 and T2. The haptic device 130 receives 234 a measurement of the position of the haptic device 130 from the CGR device 100. The haptic device 130 can then determine 236 a transformation matrix for transforming a pose referenced in one of the first and second coordinate systems to a pose referenced in the other one of the first and second coordinate systems based on the updated position of the haptic device 130 and based on the measurement of the position of the haptic device 130 received from the CGR device 100.

Figure 3A:
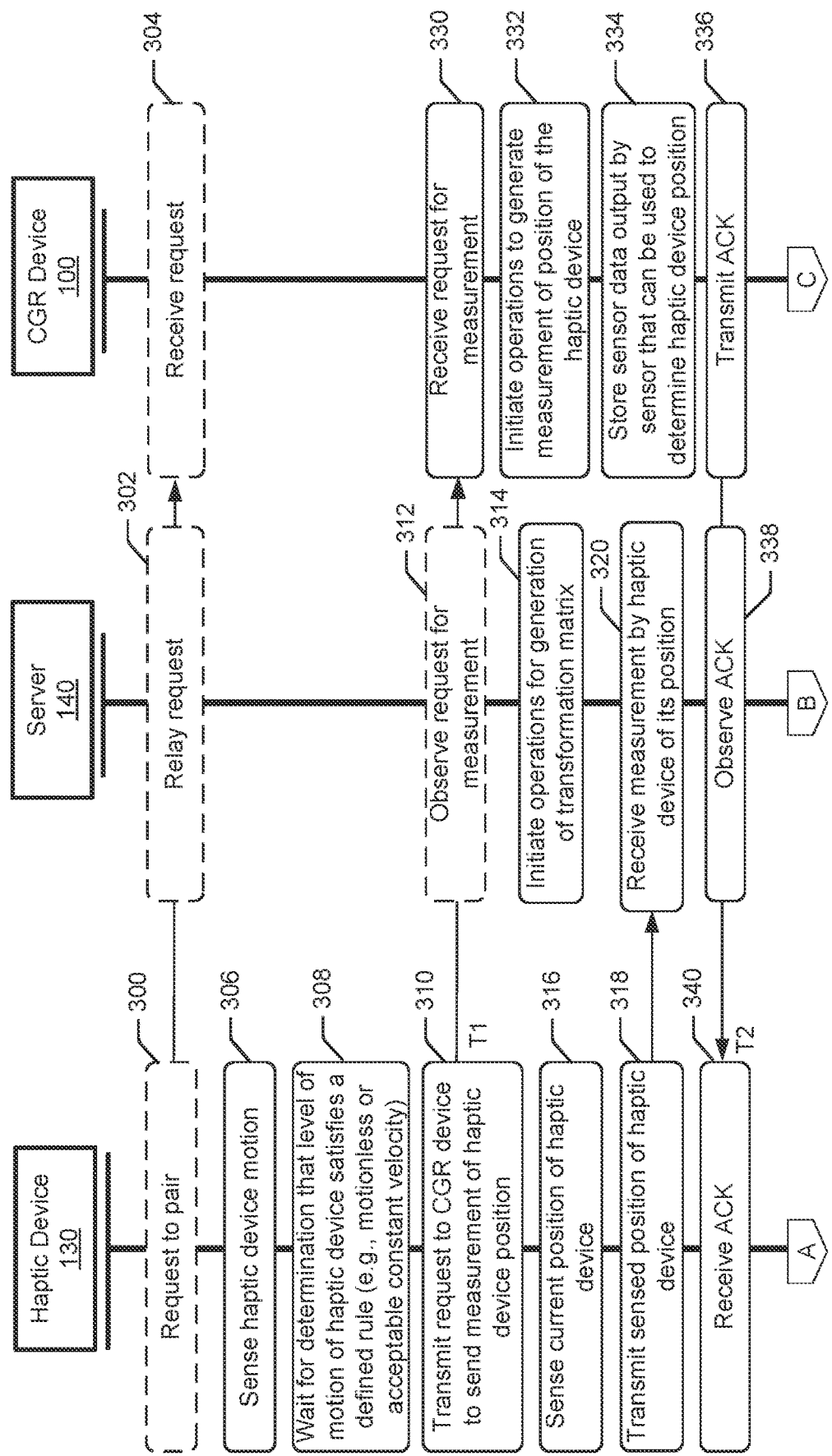
FIGS. 3a and 3b illustrate a data flow diagram and flowchart of operations by a haptic device, a server, and a CGR device which operate in accordance with some embodiments of the present disclosure.
Figure 3B:
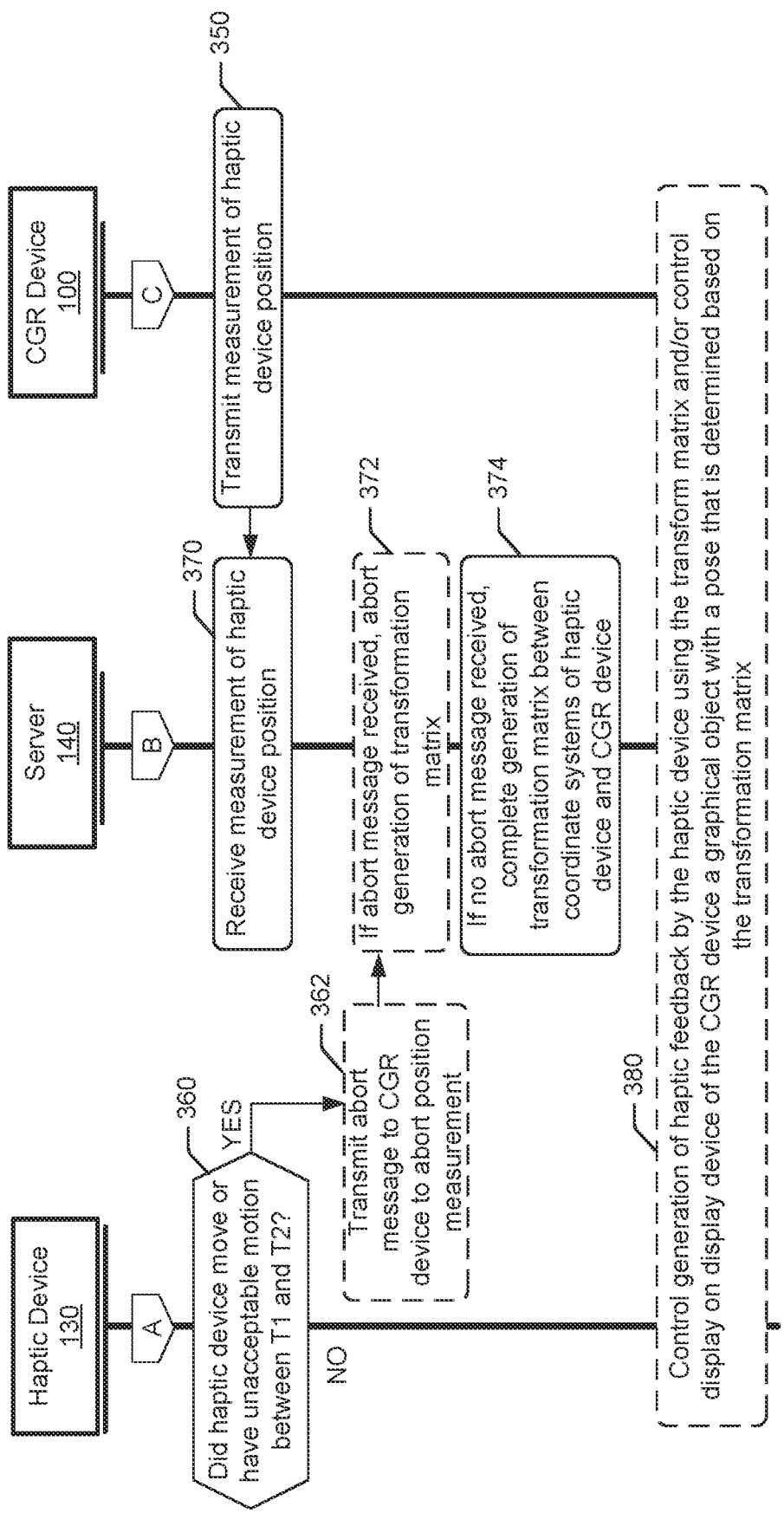

FIGS. 3a and 3b illustrate a data flow diagram and flowchart of operations by a haptic device 130, a server 140, and a CGR device 100 which operate in accordance with some embodiments of the present disclosure. In the illustrated operations, the server 140 generates the transformation matrix between the first and second coordinate systems of the haptic device 130 and the CGR device 100.

Referring to FIGS. 3a and 3b, the haptic device 130 generates 300 a pair request that is communicated to the CGR device 100 for receipt 304, and which may be relayed 302 through the server 140. The haptic device 130 senses 306 its motion and waits for a determination 308 that the level of motion satisfies a defined rule, such as by being substantially motionless or having an acceptable constant velocity. Responsive to that determination, the haptic device 130 transmits 310 a request to the CGR device 100 to send a measurement of the haptic device position to the server 140. The CGR device 100 receives 330 the request for measurement, which may be forwarded or otherwise observed 312 by the server 140.

The haptic device 130 senses 316 its current position, e.g., via motion sensor 740, and transmits 318 the sensed position to the server 140. The server initiates 314 operations for generation of a transformation metrics responsive to observing 312 the request or responsive to receiving 320 the measurement from the haptic device 130. The CGR device 100 responds to the received 330 request by initiating 332 operations to generate a measurement of the haptic device position, and stores 334 sensor data that is output by the sensor, e.g., a digital picture from the camera 110, that can be used by the CGR device 100 or the server 140 to determine the haptic device position. Responsive to storing the sensor data, the CGR device 100 transmits 336 an acknowledgment for receipt 340 by the haptic device 130. The server 140 may forward or otherwise observe 338 the acknowledgment.

The CGR device 100 transmits 350 a measurement of the haptic device position to the server 140, which is received 370 by the server 140. The haptic device 130 determines 360, either before or after receiving 370 the haptic device position measurement, whether it moved during the time interval between when the request was transmitted 310 (time T1) and when the acknowledgment was received 340 (time T2), or otherwise had motion during the time interval that did not satisfy a defined rule (e.g., having substantially constant translational and/or rotational velocity that satisfied the defined rule).

When the haptic device 130 had motion that did not satisfy the defined rule, an abort message may be transmitted 362 to the server 140 and, when received 372 by the server 140, triggers the server 140 to abort generation of the transformation matrix based on the position measurement by the haptic device 130 and the position measurement by the CGR device 100. In contrast, when the haptic device 130 remained static or otherwise had motion that satisfied the defined rule, the server 140 completes generation 374 of the transformation matrix between the first and second coordinate systems.

The transformation matrix can then be used to control 380 generation of haptic feedback by the haptic device. Alternatively or additionally, the transformation matrix can be used to control 380 display on a display device of the CGR device 100 of a graphical object with a pose is determined based on the transformation matrix. For example, the CGR device 100 may use the transformation matrix to manipulate a graphical object that is displayed, such as by positioning, rotating, adjusting color shading of the object, and/or adjusting a shape of the object based on processing metrics of the object through the transformation matrix.

Figure 4A:
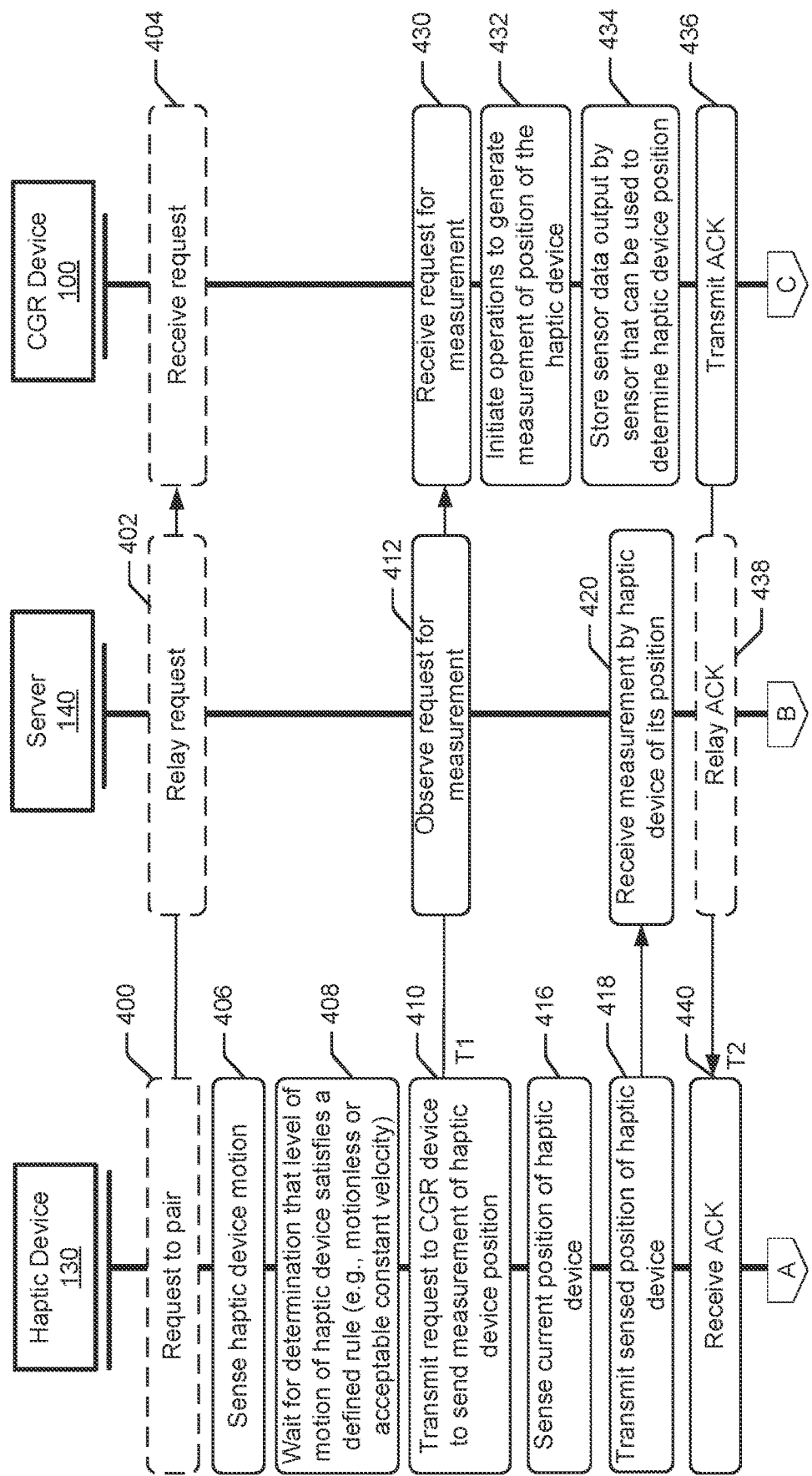
FIGS. 4a and 4b illustrate another data flow diagram and flowchart of operations by a haptic device, a server, and a CGR device which operate in accordance with some other embodiments of the present disclosure.
Figure 4B:
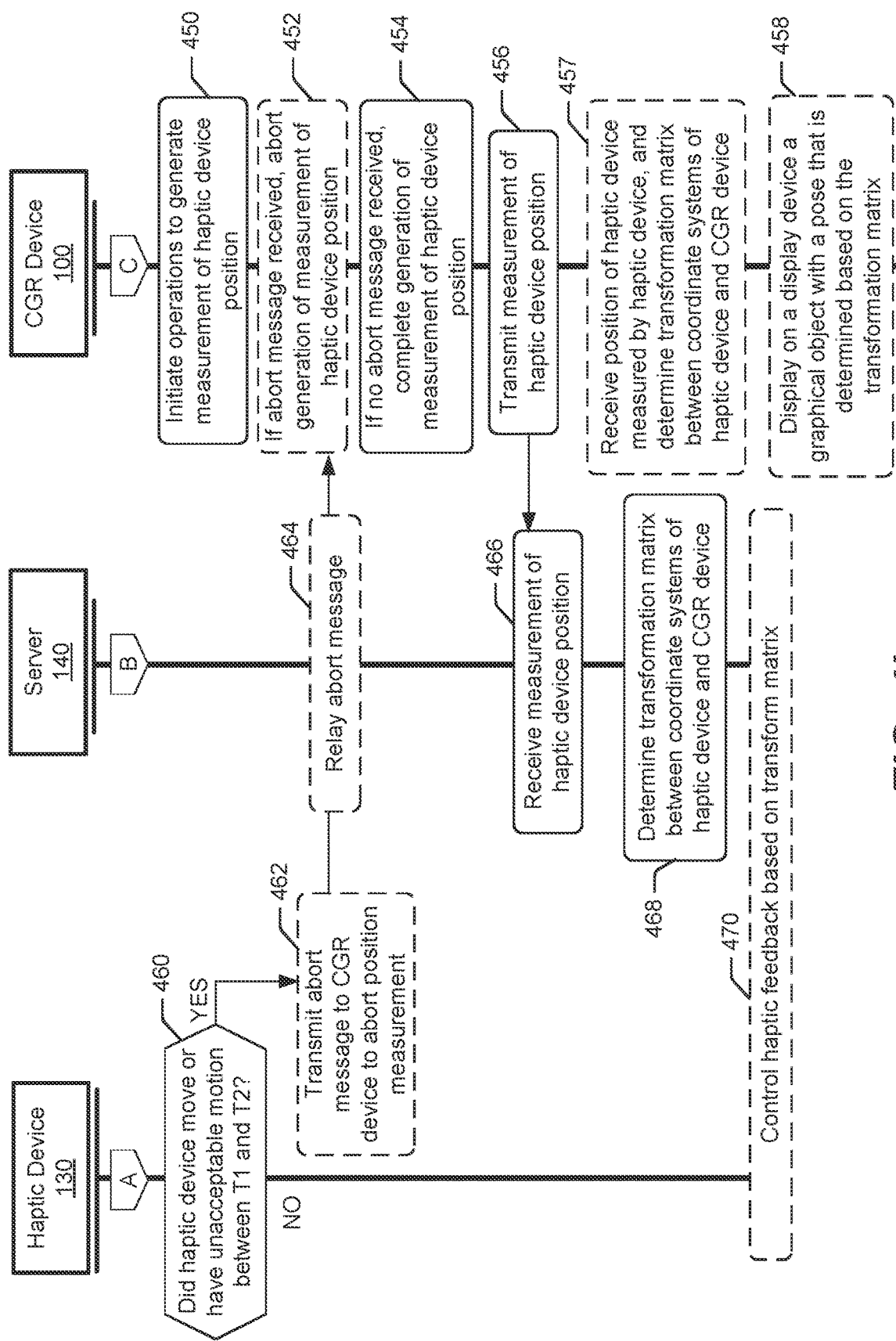

FIGS. 4a and 4b illustrate another data flow diagram and flowchart of operations by a haptic device 130, a server 140, and a CGR device 100 which operate in accordance with some other embodiments of the present disclosure. In the illustrated operations, the CGR device 100 and/or the server 140 generates the transformation matrix between the first and second coordinate systems of the haptic device 130 and the CGR device 100.

Referring to FIGS. 4a and 4b, the haptic device 130 generates 400 a pair request that is communicated to the CGR device 100 for receipt 404, and which may be relayed 402 through the server 140. The haptic device 130 senses 406 its motion, and waits for a determination 408 that the level of motion satisfies a defined rule, such as by being substantially motionless (static) or having an acceptable constant velocity. Responsive to that determination, the haptic device 130 transmits 410 a request to the CGR device 100 to generate a measurement of the haptic device position. The CGR device 100 receives 430 the request for measurement, which may be forwarded or otherwise observed 412 by the server 140.

The haptic device 130 senses 416 its current position, e.g., via the motion sensor 740, and transmits 418 the sensed position to the server 140 and/or to the CGR device 100. The CGR device 100 responds to the received 430 request by initiating 432 operations to generate a measurement of the haptic device position, and stores 434 sensor data that is output by the sensor, e.g., a digital picture from the camera 110, that can be used by the CGR device 100 or the server 140 to determine the haptic device position. Responsive to storing the sensor data, the CGR device 100 transmits 436 an acknowledgment for receipt 440 by the haptic device 130. The server 140 may forward or otherwise observe 438 the acknowledgment.

The haptic device 130 determines 460, whether it moved during the time interval between when the request was transmitted 410 (time T1) and when the acknowledgment was received 440 (time T2), or otherwise had motion during the time interval that did not satisfy a defined rule (e.g., having substantially constant translational and/or rotational velocity that satisfied the defined rule).

When the haptic device 130 had motion that did not satisfy the defined rule, an abort message may be transmitted 462 to the CGR device 100 and/or the server 140, which may forward 464 the report message. If the abort message is received, it triggers the CGR device 100 to abort 452 generation of the measurement of the haptic device position. In contrast, when the haptic device 130 remained static or otherwise had motion that satisfied the defined rule, the CGR device 100 does not receive the abort message and therefore completes generation 454 of the measurement of the haptic device position, and may operate to transmit 456 the measurement to the server for receipt 466.

The CGR device 100 may receive 457 the position of the haptic device 130 that is measured by the haptic device 130, and determine the transformation matrix between the first and second coordinate systems. The CGR device 100 may use the transformation matrix to control display 458 of a graphical object with a pose that is determined based on the transformation matrix. For example, the CGR device 100 may manipulate a graphical object that is displayed, such as by positioning, rotating, adjusting color shading of the object, and/or adjusting a shape of the object based on processing metrics of the object through the transformation matrix.

Alternatively or additionally, the server 140 may receive 466 the measurement of the haptic device position, and determine 468 the transformation matrix between the first and second coordinate systems. The transformation matrix can then be used to control 470 generation of haptic feedback by the haptic device. Alternatively or additionally, the transformation matrix generated by the server 140 can be used to control 380 display on a display device of the CGR device 100 of a graphical object with a pose is determined based on that transformation matrix.

Figure 5:
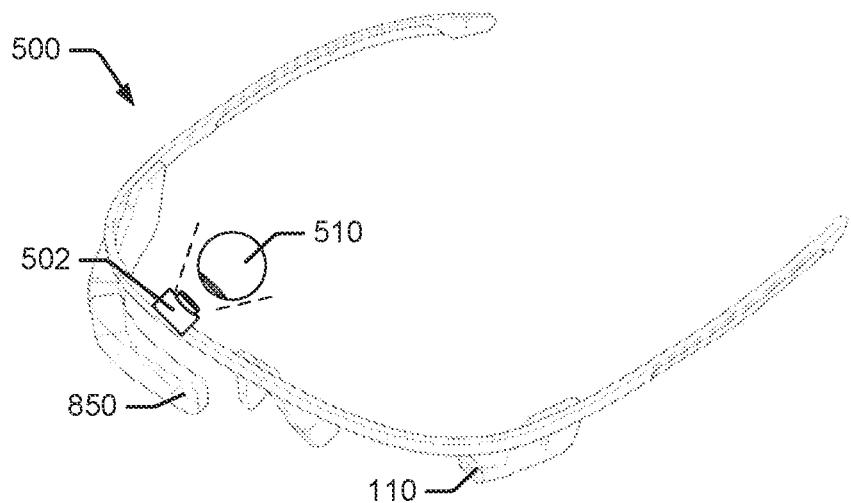
FIG. 5 illustrates another type of CGR device having a user facing camera and which operates in accordance with some embodiments of the present disclosure.

FIG. 5 illustrates another type of CGR device 500 (e.g., Google Glass) having a user facing camera 502 which displays computer-generated objects on a display device 850 and which allows a user to see the real-world objects through the display device 850 and/or to see the real-world objects outside an area of the display device 850, in accordance with some embodiments of the present disclosure. A digital image from the user facing camera 502 can be processed to automatically determine when an updated transformation matrix needs to be generated, and responsively initiate generation thereof. FIG. 6 illustrates a flowchart of related operations by the CGR device 100 to initiate generation of an updated transformation matrix in accordance with some embodiments of the present disclosure.

Figure 6:
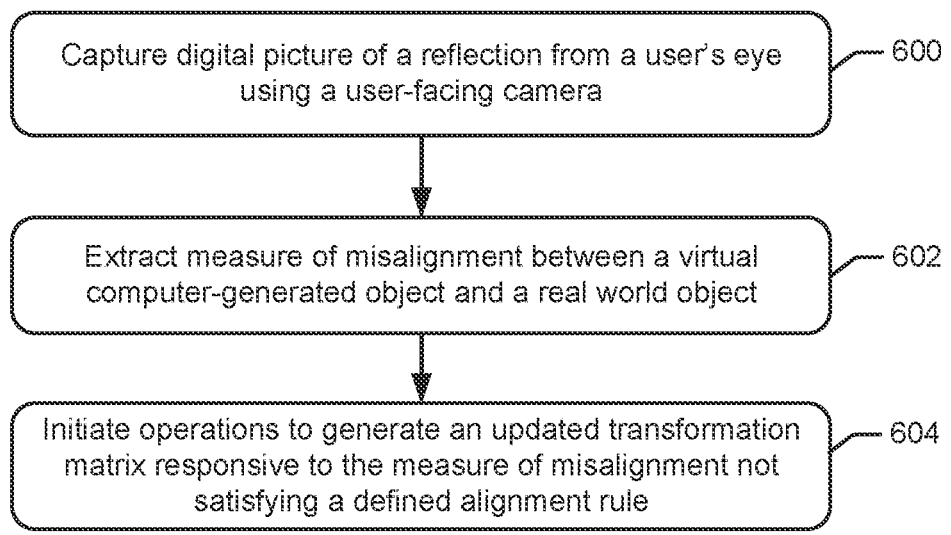
FIG. 6 illustrates a flowchart of operations by a CGR device to initiate generation of an updated transformation matrix in accordance with some embodiments of the present disclosure.

Referring to FIGS. 5 and 6, the CGR device 500 operates the user facing camera 502 to capture 600 a digital picture of a reflection from the user's eye 510. The reflection from the user's eye 510 includes a first component that is a reflection of a virtual computer-generated object displayed on the display device 850 and a second component that is a reflection of light from a real world object. The CGR device 500 processes 602 the image to extract a measure of misalignment between the virtual computer-generated object and the real world object. The CGR device 500 responds to the measure of misalignment not satisfying a defined alignment rule, by initiating 604 operations to generate an updated transformation matrix, such as the operations shown in FIGS. 2, 3a-3b, and/or 4a-4b.

Cloud Implementation

Some or all operations described above as being performed by the haptic device 130, the server 140, and/or the CGR device 100 may alternatively be performed by another node that is part of a network operator cloud computing resource. For example, those operations can be performed as a network function that is close to the edge, such as in a cloud server or a cloud resource of a telecommunications network operator, e.g., in a CloudRAN or a core network.

Example Haptic Device, CGR Device, and Server Configurations

FIG. 7 is a block diagram of components of a haptic device 130 that are configured in accordance with some other embodiments of the present disclosure. The haptic device 130 can include a motion sensor 740, a network interface circuit 730, at least one processor circuit 710 (processor), and at least one memory 720 (memory). The motion sensor 740 may include an inertial measurement unit. The network interface circuit 730 is configured to communicate with another electronic device through a wired (e.g., ethernet, USB, etc.) and/or wireless (e.g., Wi-Fi, Bluetooth, cellular, etc.) network interface. The haptic device 130 may further include a haptic feedback generation device 750 that is configured to provide haptic feedback to a user, such as force feedback and/or vibration. The processor 710 is connected to the motion sensor 740, the network interface circuit 730, the haptic feedback generation device 750, and the memory 720. The memory 720 stores program code that is executed by the processor 710 to perform operations. The processor 710 may include one or more data processing circuits, such as a general purpose and/or special purpose processor (e.g., microprocessor and/or digital signal processor), which may be collocated or distributed across one or more data networks. The processor 710 is configured to execute computer program instructions among program code 722 in the memory 720, described below as a computer readable medium, to perform some or all of the operations and methods for one or more of the embodiments disclosed herein for a haptic device 130.

FIG. 8 is a block diagram of CGR device components 800 that may be used in the CGR devices 100 and/or 500 described above, and which operate according to at least some embodiments of the present disclosure. The CGR device components 800 can include a motion sensor 840, a network interface circuit 830, a speaker 120, at least one processor circuit 810 (processor), a display device 850, a front facing camera 110, the user facing camera 502, and at least one memory 820 (memory). The motion sensor 840 may include an inertial measurement unit. The network interface circuit 830 is configured to communicate with another electronic device through a wired (e.g., ethernet, USB, etc.) and/or wireless (e.g., Wi-Fi, Bluetooth, cellular, etc.) network interface. The processor 810 is connected to the motion sensor 840, the display device 850, the front facing camera 110, the user facing camera 502, the speaker 120, the network interface 830, and the memory 820. The memory 820 stores program code that is executed by the processor 810 to perform operations. The processor 810 may include one or more data processing circuits, such as a general purpose and/or special purpose processor (e.g., microprocessor and/or digital signal processor), which may be collocated or distributed across one or more data networks. The processor 810 is configured to execute computer program instructions among program code 822 in the memory 820, described below as a computer readable medium, to perform some or all of the operations and methods for one or more of the embodiments disclosed herein for a CGR device 100.

Figure 9:
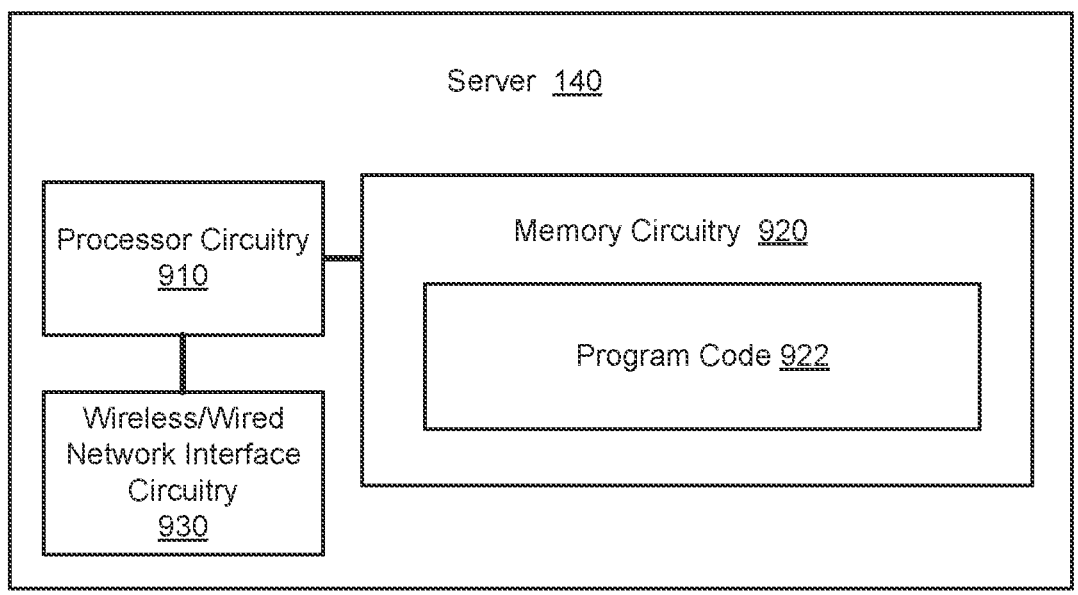
FIG. 9 is a block diagram of server components that are configured in accordance with some other embodiments of the present disclosure.

FIG. 9 is a block diagram of components of a server 140 that are configured in accordance with some other embodiments of the present disclosure. The server 140 can include a network interface circuit 930, at least one processor circuit 910 (processor), and at least one memory 920 (memory). The network interface circuit and 30 is configured to communicate with another electronic device through a wired (e.g., ethernet, USB, etc.) and/or wireless (e.g., Wi-Fi, Bluetooth, cellular, etc.) network interface. The processor 910 is connected to network interface 930 in the memory 920. The memory 920 stores program code 922 that is executed by the processor 910 to perform operations. The processor 910 may include one or more data processing circuits, such as a general purpose and/or special purpose processor (e.g., microprocessor and/or digital signal processor), which may be collocated or distributed across one or more data networks. The processor 910 is configured to execute computer program instructions among program code 922 in the memory 920, described below as a computer readable medium, to perform some or all of the operations and methods for one or more of the embodiments disclosed herein for a server 140.

Further Definitions and Embodiments:

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A second electronic device for measuring a position of a first electronic device relative to the second electronic device, the second electronic device comprising:
   a display device which allows a user to see real-world objects through the display device;
   a user-facing camera;
   a processor; and
   a memory storing program code that is executed by the processor to perform operations comprising:
   capturing a digital picture of a reflection from a user's eye using the user-facing camera, wherein the reflection from the user's eye includes a first component that is a reflection of a virtual computer-generated object displayed on the display device and a second component that is a reflection of light from a real world object;
   processing the digital picture to extract a measure of misalignment between the virtual computer-generated object and the real-world object; and
   responsive to the measure of misalignment not satisfying a defined alignment rule, generating an updated transformation matrix.

2. The second electronic device of claim 1, wherein the virtual computer-generated object is aligned with the real-world object.

3. The second electronic device of claim 1, wherein the operations further comprise determining a transformation matrix for transforming a pose referenced in a first coordinate system to a pose referenced in a second coordinate system based on a position of the first electronic device sensed by and received from the first electronic device and based on a measurement of a position of the first electronic device by the second electronic device, wherein one of the first coordinate system and the second coordinate system is used to reference a pose of one of the first electronic device and the second electronic device, and wherein the other one of the first coordinate system and the second coordinate system is used to reference a pose of the other one of the first electronic device and the second electronic device.

4. The second electronic device of claim 1, wherein the second electronic device comprises a computer-generated reality (CGR) device, and wherein the first electronic device comprises a haptic device configured to perform at least one of measuring movement of the haptic device by the user and providing haptic feedback to the user.

5. The second electronic device of claim 1, wherein the operations further comprise displaying on the display device a graphical object with a pose that is determined based on the updated transformation matrix.

6. A method by a second electronic device for measuring a position of a first electronic device relative to the second electronic device, the method comprising:
   capturing a digital picture of a reflection from a user's eye using a user-facing camera, wherein the reflection from the user's eye includes a first component that is a reflection of a virtual computer-generated object displayed on a display device which allows a user to see real-world objects through the display device and a second component that is a reflection of light from a real world object;
   processing the digital picture to extract a measure of misalignment between the virtual computer-generated object and the real-world object; and
   responsive to the measure of misalignment not satisfying a defined alignment rule, generating an updated transformation matrix.

7. The method of claim 6, wherein the virtual computer-generated object is aligned with the real-world object.

8. The method of claim 6, further comprising determining a transformation matrix for transforming a pose referenced in a first coordinate system to a pose referenced in a second coordinate system based on a position of the first electronic device sensed by and received from the first electronic device and based on a measurement of a position of the first electronic device by the second electronic device, wherein one of the first coordinate system and the second coordinate system is used to reference a pose of one of the first electronic device and the second electronic device, and wherein the other one of the first coordinate system and the second coordinate system is used to reference a pose of the other one of the first electronic device and the second electronic device.

9. The method of claim 6, wherein the second electronic device comprises a computer-generated reality (CGR) device, and wherein the first electronic device comprises a haptic device configured to perform at least one of measuring movement of the haptic device by the user and providing haptic feedback to the user.

10. The method of claim 6, further comprising displaying on the display device a graphical object with a pose that is determined based on the updated transformation matrix.

11. A computer program product configured for operating a second electronic device for measuring a position of a first electronic device relative to the second electronic device, the computer program product comprising a non-transitory computer readable medium storing a instructions which, when executed by a computer of the second electronic device, cause the computer to:
  capture a digital picture of a reflection from a user's eye using a user-facing camera, wherein the reflection from the user's eye includes a first component that is a reflection of a virtual computer-generated object displayed on a display device which allows a user to see real-world objects through the display device and a second component that is a reflection of light from a real world object;
  process the digital picture to extract a measure of misalignment between the virtual computer-generated object and the real-world object; and
  responsive to the measure of misalignment not satisfying a defined alignment rule, generate an updated transformation matrix.

* * * * *